United States Patent Office 3,268,489
Patented August 23, 1966

3,268,489
ANTISTATIC TREATMENT OF RESINS
William R. Dial, Akron, Ohio, assignor to Pittsburgh Plate Glass Company, Pittsburgh, Pa., a corporation of Pennsylvania
No Drawing. Filed Feb. 13, 1962, Ser. No. 172,870
4 Claims. (Cl. 260—78.5)

This invention relates to an improved method for preventing the accumulation of electrostatic charges on synthetic resins. It relates in particular to a method of reducing the tendency of vinyl copolymers, notably methyl methacrylate-maleic anhydride, to accumulate electrostatic charge.

It is well-known that articles manufactured from synthetic resins have a tendency to accumulate electrostatic charge. Certain synthetic resins manifest this tendency to a degree much greater than others. This electrostatic charge accumulation leads to disagreeable electric shock, ignition of inflammable solvents, accumulation of dust on molds used in shaping articles of resins and many other objectionable and even dangerous consequences.

The prior art has advanced ways of reducing this tendency of materials made from synthetic resins to accumulate electrostatic charge. These include spraying the material with hygroscopic substance or electrically conducting substances; blending partially electrically conducting materials with the resin stock from which the article is formed; incorporating partially electrically conducting substances in monomers or monomer mixtures before the polymeric material is formed; and a variety of other proposals. No completely satisfactory method of eliminating or reducing the objectionable accumulation of electrostatic charge has been discovered.

In accordance with this invention thermoplastic copolymers of ethylenically unsaturated monomers and dibasic acid anhydrides, notably methylmethacrylate-maleic anhydride copolymers are treated to convert dibasic acid anhydride units on the resin surface to electrically conducting groups, notably salt and carboxylic acid groups. This is accomplished by contacting the resin with hot aqueous media at a temperature of at least 80° C. (usually 95 to 105° C., and rarely above 120° C.) to cause hydrolysis of the acid anhydride units on the resin surface. Particularly effective hot aqueous media are aqueous solutions of bases, notably aqueous dimethylaminoethanol.

Copolymerization of vinyl monomer with unsaturated dibasic acids as known in the art results in a resin with totally different properties from these resins produced as incident to the present invention wherein treatment produces conducting groups on the resin surface and not throughout the resin mass.

Copolymers as employed in this invention are obtained, in general, by polymerization of a mixture of vinylic compound (ethylenically unsaturated monomer) and unsaturated dibasic acid anhydride. The dibasic acid anhydride employed is generally a cyclic anhydride containing one double bond in the anhydride ring. Other dibasic acid anhydrides may be employed in which there is no double bond in the anhydride ring. These result, generally, from the condensation of a cyclic dibasic acid anhydride which contains one double bond in the anhydride ring with dienes to form a different unsaturated dibasic acid anhydride. Dienes forming this type of unsaturated dibasic acid anhydride are by way of illustration: butadiene, cyclopentadiene, and cyclobutadiene. Certain dibasic acid anhydrides of this latter type have been synthesized which contain a second double bond. These compounds may also be employed in the present invention. Mixtures of two or more of the above described dibasic acid anhydrides may be employed.

The copolymers are advantageously prepared by known methods such as warming a mixture of vinylic compound and unsaturated dibasic acid anhydride containing from 1 to 20 percent by weight of dibasic acid anhydride with from 0.01 to 5.0 parts per 100 by weight of the mixture of an organic peroxide, such as diisopropyl peroxydicarbonate. Other known methods of preparing the copolymer may also be employed.

Treatment of the copolymers in accordance with this invention comprises contacting the resin with hot aqueous media at temperatures above 80° C., and rarely above 120° C., under superatmospheric pressure. Usually treatment with a boiling aqueous media at 760 millimeters pressure will suffice and often temperatures as low as 95° C., or even lower, may be employed. It is desired to avoid temperatures which cause excessive distortion of the resin, but high enough to permit conversion of at least a portion of the anhydride groups on the surface of the resin to electrically conducting groups. Basic aqueous solutions permit conversion of the dibasic acid anhydride groups to conducting groups in a shorter period of time than water containing no added base. Such conducting groups probably owe their conductivity to the presence of ionic species ordinarily attributed to acid groups or salt groups. In the presence of base, acid groups resulting from hydrolysis are converted to salt groups.

In one embodiment of the invention methyl methacrylate-maleic anhydride copolymers containing from 5 to 20 percent by weight maleic anhydride are contacted with hot water at approximately the normal boiling point for a period of time insufficient to distort the resin but sufficient to render the surface thereof partially electrically conducting.

In another embodiment of the invention methyl methacrylate-maleic anhydride copolymers are treated by contacting for a period of time in a hot solution of dimethylaminoethanol in water. Dimethylaminoethanol is believed to react with the maleic anhydride groups at intervals along the copolymer chain to form dimethyl-$\beta$-hydroxyethylammonium salt groups which render the surface of the resin semi-conducting.

Still another embodiment of the invention involves treating a coplyomer such as that formed by copolymerizing styrene with citraconic (cis-methylmaleic) anhydride with aqueous alkali metal hydroxide, notably sodium hydroxide. However, it is preferred to employ organic bases in aqueous solution.

The following examples are illustrative of the present invention:

*Example I*

Methyl methacrylate is mixed in the proportion of 80 parts by weight of methyl methacrylate with 20 parts by weight of maleic anhydride and stirred until solution is complete. To 100 grams of this mixture is added 0.2 gram of diisopropyl peroxydicarbonate. When the diisopropyl peroxydicarbonate has dissolved, sufficient of this mixture is placed in a test tube 2 x 15 centimeters to fill it approximately one-half full. The test tube is then placed in a water bath maintained at 25° C. and allowed to stand for approximately 18 hours, at the end of which time polymerization is substantially complete. To insure complete polymerization, the test tube is placed in an oven at 100° C. for one hour. After chilling, the resin casting is removed from the test tube and is now ready for treatment to impart the antistatic properties.

Several test tube castings of methyl methacrylate-maleic anhydride resin are prepared as indicated above to provide a sufficient number, such that some may be treated by contacting in boiling water and some by contacting in an aqueous dimethylaminoethanol solution, and still others which will receive no treatment.

Three test tube castings prepared as above are contacted with boiling water for 2.5 hours and are then removed and allowed to cool. To a boiling 25 percent by weight solution of dimethylaminoethanol, three other test tube castings prepared as above are added and allowed to remain in the boiling solution for 15 minutes, at the end of which time they are removed and allowed to cool. A third set of three test tube castings remains untreated.

Each of the test tube castings thus prepared and treated is rubbed with a piece of white wool cloth for two minutes to charge electrically. Each casting in succession is held at a height of one-fourth inch above freshly prepared cigarette ashes. It is observed that only the castings which are untreated attract the ashes.

*Example II*

Following the procedure of Example I, ethyl acrylate, 90 parts by weight, and maleic anhydride 10 parts by weight, are mixed and polymerized to obtain another set of castings corresponding to those of Example I. The castings which are treated in boiling water and alternatively with 25 percent by weight of aqueous dimethylaminoethanol fails to attract cigarette ashes, while the untreated controls readily attract ashes.

*Example III*

A series of methyl methacrylate-maleic anhydride resins are prepared as in Example I, such that copolymers containing 5, 7.5, 10 and 15 percent maleic anhydride by weight, are obtained. Some test tube castings are treated with 15 percent by weight boiling aqueous dimethylaminoethanol for 15 minutes and some remain untreated. After cooling and drying, these samples are rubbed with a wool cloth. Those which contain 5 and 7.5 percent maleic anhydride by weight, attract some cigarette ashes when the cigarette ash test is applied although the quantity of ashes attracted is only a fraction of that attracted by the untreated control samples. However, those samples containing 10 and 15 percent by weight of maleic anhydride fail to attract ashes.

*Example IV*

Styrene is substituted for methyl methacrylate in Example I with similar results.

*Example V*

Citraconic anhydride is substituted for maleic anhydride and tested as in Example I. Those samples containing citraconic anhydride which are treated with boiling water and alternatively boiling aqueous dimethylaminoethanol are antistatic in the cigarette ash test given in Example I.

Anhydrides which may be used in the present invention are the unsaturated dibasic acid anhydride homologues of maleic anhydride and condensation products derived from these substances with dienes. Specifically included in the scope of this invention are maleic anhydride, citraconic anhydride, dimethylmaleic anhydride, ethylmaleic anhydride, itaconic anhydride, methylitaconic anhydride and higher molecular weight unsaturated dibasic anhydrides containing up to about 18 carbon atoms obtained by condensation of certain olefins and maleic anhydride itself, notably endomethylenetetrahydrophthalic anhydride and cis-4-cyclohexene-1,2-dicarboxylic acid anhydride.

Substances which may be used to copolymerize with the unsaturated dibasic acid anhydride are ethylene derivatives usually substituted with one or two acidic groups on the same carbon atom. Those of specific interest include: ethylene, propylene, alkyl acrylates, notably methyl and ethyl; the alkyl methacrylates, notably methylmethacrylate and ethyl methacrylate; styrene, α-methylstyrene, vinyl chloride, vinyl esters such as vinyl acetate, vinyl ethers, 2-chloropropene, and vinylnaphthalene.

While in general more than 10 percent by weight unsaturated dibasic acid anhydride may be employed in the practice of this invention, the moisture sensitivity of certain contemplated resins may be adversely influenced with quantities of unsaturated dibasic acid anhydride much above 10 percent. That is, the surface of the resin tends to check and become opaque as the concentration of unsaturated dibasic acid anhydride approaches 20 percent. On the other hand, when the quantity of unsaturated dibasic acid anhydride is reduced below 10 percent by weight, the antistatic properties tend to be reduced. For some resin combinations, however, from 1 to 7 percent by weight of unsaturated dibasic acid anhydride may be employed to prevent electrostatic build-up. Under conditions of extremely low humidity, protection from electrostatic accumulation is more effectively achieved by the use of higher amounts of unsaturated dibasic acid anhydride.

Protection from electrostatic build-up is achieved by contacting the resins in boiling aqueous solutions of organic base, notably dimethylaminoethanol. Attack on the resin surface is more rapid with organic base than with water alone, and for this reason the organic base treatment is preferred. Bases which may be employed with satisfactory results include: ethanolamine, diethanolamine, triethanolamine, methylaminoethanol, dimethylaminoethanol, propylaminoethanol, methyldiethanolamine, ethyldiethanolamine, monoethylaminoethyl ethyl ether, methylamine, dimethylamine, trimethylamine, ethylamine, diethylamine, triethylamine, propylamine, di-n-propylamine, tri-n-propylamine, isopropylamine, diisopropylamine, triisopropylamine, butylamine, pyridine, quinoline, piperidine, piperazine, α-picoline, β-picoline, γ-picoline, ethylenediamine, diethylenetriamine, tetramethylaminoethylene. In addition, mixtures of bases may be employed.

The concentration of organic base may vary from approximately 1 percent to the solubility limit of the particular amine in water. It is preferred to use from 15 to 25 percent solutions by weight in order to produce the desired degree of surface modification in approximately 15 minutes. Thus, an aqueous solution containing 1 percent by weight of an amine may be used in the treatment but at the expense of prolonging the time beyond 15 minutes to approach the time required when water alone is used. That is, 2.5 hours is required in water or very dilute base solutions to produce sufficient surface modification to render the resin antistatic.

While treatment of the resin by contacting with hot aqueous media has been described above, temperatures may be employed other than those obtained by heating the aqueous media to their boiling points under normal pressure. It is often desirable to employ lower temperatures with highly volatile bases to prevent loss of the base by volatilization. However, if arrangement is provided for contacting the resin with the aqueous media under pressure, higher temperatures may be employed without risk of loss of the volatile base. Thus, the time contact may be shortened by employing elevated temperatures even above 100° C., such that the practical limitation on the upper limit of temperature is determined by the heat distortion characteristic of the resin. Conversely, if treatment of the resin with a volatile amine is preferred at a lower temperature, the time of treatment is prolonged in proportion to the reduction in treatment temperatures.

The invention herein described may be employed for imparting antistatic properties to any copolymer which contains active acid groups which will react with basic compounds. It is advantageously employed in a surface treatment of the polymer which at the time of treatment may be in the form of molded articles, extruded articles, woven articles, pellets, resin powder before molding to minimize static effects in mold filling, fibers, cast resin articles and the like. Further, the invention has been described primarily for application to thermoplastic copolymers as described above. Subsequent conversion of copolymers which are substantially thermoplastic into copolymers which are of the thermosetting type, may also be envisioned within the scope of the invention. Thus, thermoplastic resins may be first rendered thermosetting by treatment with radiation, or by including in the copolymer a reactive group which can be utilized in formation of a thermosetting resin by crosslinking, prior to applying the treatment of the invention disclosed herein.

While the invention has been described with reference to the details of certain specific embodiments, it is not intended that the invention be limited thereto except insofar as indicated by the appended claims.

I claim:

1. A method of imparting antistatic properties to the surface of a copolymer of a mixture of from 1 to about 10 percent by weight of a dibasic acid anhydride having up to 18 carbon atoms and about 90 to 99 percent by weight of substituted ethylene selected from the group consisting of propylene, alkyl acrylates, alkyl methacrylates, styrene, α-methylstyrene, vinyl chloride, vinyl esters, vinyl ethers, 2-chloropropene and vinylnaphthalene, said mixture being polymerized in the presence of a free radical catalyst, which comprises applying to the surface of the copolymer a hot, aqueous medium at a temperature above 80° C., said aqueous medium being selected from a group consisting of water and aqueous solutions consisting of water and a water soluble organic base, said copolymer being insoluble in said hot aqueous media, removing said hot aqueous media from the surface of said copolymer and obtaining a polymeric product having electrically conducting groups on the surface thereof.

2. The method of claim 1 wherein the dibasic acid anhydride is selected from the group consisting of maleic anhydride, citraconic anhydride, itaconic anhydride, methylitaconic anhydride, endomethylenetetrahydrophthalic anhydride and cis-4-cyclohexene-1,2-dicarboxylic acid anhydride.

3. The method of claim 1 where the aqueous medium is an aqueous solution containing about 1 percent to the solubility limit of a water soluble organic amine.

4. A method of imparting antistatic properties to the surface of a copolymer of a mixture of from 1 to about 10 percent by weight of maleic anhydride and about 90 to 99 percent by weight of methyl methacrylate, said mixture being polymerized in the presence of a free radical catalyst which comprises applying to the surface of the copolymer an aqueous solution containing 1 to 25 percent by weight, basis the solution, of a water soluble organic amine at a temperature above 80° C., removing said hot aqueous solution from the surface of said copolymer and obtaining a polymeric product having electrically conducting groups on the surface thereof.

References Cited by the Examiner

UNITED STATES PATENTS

| 2,047,398 | 7/1936 | Voss | 260—78.5 |
| 2,074,647 | 3/1937 | Hagedorn et al. | 96—87 |
| 2,609,350 | 9/1952 | Spatt | 117—139.5 |
| 2,723,195 | 11/1955 | Blake | 260—78.5 |
| 2,757,153 | 7/1956 | Bowen | 260—78.5 |
| 2,912,413 | 11/1959 | Baer | 260—78.5 |

FOREIGN PATENTS

| 833,459 | 4/1960 | Great Britain. |

JOSEPH L. SCHOFER, *Primary Examiner.*

JOSEPH R. LIBERMAN, *Examiner.*

L. WOLF, *Assistant Examiner.*